(12) United States Patent
Rehbein et al.

(10) Patent No.: US 7,238,024 B2
(45) Date of Patent: Jul. 3, 2007

(54) METHOD AND APPARATUS FOR PERFORMING A TRANSACTION WITHOUT THE USE OF SPOKEN COMMUNICATION BETWEEN THE TRANSACTION PARTIES

(76) Inventors: Jürg Rehbein, 574 West End Ave. #54, New York, NY (US) 10024; Andres Fehr, 3-18-12 Sengen-cho Higashi-kurume-shi, Tokyo (JP) 203-0012; Maki Oshima-Fehr, 3-18-12 Sengen-cho Higashi-kurume-shi, Tokyo (JP) 203-0012; Leah Demchick, 574 West-End Ave. #54, New York, NY (US) 10024

( * ) Notice: Subject to any disclaimer, the term of this patent is extended or adjusted under 35 U.S.C. 154(b) by 337 days.

(21) Appl. No.: 10/770,636

(22) Filed: Feb. 2, 2004

(65) Prior Publication Data

US 2005/0017453 A1   Jan. 27, 2005

Related U.S. Application Data

(63) Continuation-in-part of application No. 10/144,513, filed on Oct. 25, 2001, now Pat. No. 6,685,188.

(51) Int. Cl.
  *G09B 19/08* (2006.01)
(52) U.S. Cl. .................. 434/157; 434/156; 434/307 R; 704/1; 704/2; 704/8; 705/26
(58) Field of Classification Search ................ 434/118, 434/156, 157, 169, 185, 307 R, 308, 365; 704/2, 8, 260; 705/1, 26; 719/246; 715/752, 715/839; 273/298, 299
  See application file for complete search history.

(56) References Cited

U.S. PATENT DOCUMENTS

| | | | |
|---|---|---|---|
| 4,774,666 A * | 9/1988 | Miyao et al. .................. 704/2 |
| 5,576,953 A * | 11/1996 | Hugentobler .................. 704/2 |
| 5,742,779 A * | 4/1998 | Steele et al. ................. 715/839 |
| 5,865,625 A * | 2/1999 | Baskerville .................. 434/157 |
| 5,882,202 A * | 3/1999 | Sameth et al. ............... 434/157 |
| 5,885,081 A * | 3/1999 | Tamura et al. ............... 434/169 |
| 5,974,372 A * | 10/1999 | Barnes et al. .................. 704/8 |
| 6,490,563 B2 * | 12/2002 | Hon et al. ................... 704/260 |
| 6,509,910 B1 * | 1/2003 | Agarwal et al. ............. 715/752 |
| 6,575,468 B1 * | 6/2003 | Hall ........................... 273/298 |
| 6,685,188 B2 * | 2/2004 | Rehbein et al. .............. 273/299 |
| 2002/0124109 A1 * | 9/2002 | Brown ........................ 709/246 |
| 2002/0137012 A1 * | 9/2002 | Hohl ........................... 434/156 |
| 2002/0169691 A1 * | 11/2002 | Yukimachi et al. ........... 705/26 |
| 2004/0083111 A1 * | 4/2004 | Rehbein et al. ................ 705/1 |

* cited by examiner

*Primary Examiner*—Joe H. Cheng
(74) *Attorney, Agent, or Firm*—Jones Day (57) ABSTRACT

An electronic device capable of displaying a computer application that allows the use of a method for performing a transaction without the use of spoken communication is disclosed. The method consists of providing at least one digital, transactional flash card displayed on the electronic device having information about the transaction and the transaction goal displayed on it, in text understandable to the user and different text understandable to the party from whom the user wishes to purchase goods or services. The digital, transactional flash cards can have inquiries about price, payment methods, or shipping terms. Also disclosed are the navigational interface for the software application and different display methods.

17 Claims, 11 Drawing Sheets

FIG. 12

US 7,238,024 B2

METHOD AND APPARATUS FOR PERFORMING A TRANSACTION WITHOUT THE USE OF SPOKEN COMMUNICATION BETWEEN THE TRANSACTION PARTIES

CROSS-REFERENCE TO RELATED APPLICATIONS

This application is a continuation-in-part of U.S. patent application Ser. No. 10/144,513 filed on Oct. 25, 2001, which has matured as U.S. Pat. No. 6,685,188, issued on Feb. 3, 2004, the entirety of which application is incorporated herein by reference thereto.

BACKGROUND OF THE INVENTION

The present invention relates generally to an electronic device that uses a computer application that allows parties the use of transactional flash cards on digital screens of any such electronic device. More particularly it relates to a computer application that lets a user control a digital device that displays digital transactional flash cards. Transactional flash cards are described in pending U.S. patent application Ser. No. 10/144,513, filed Oct. 25, 2001 by Rehbein et al., titled "Method and Apparatus for Performing a Transaction Without the Use of Spoken Communication Between the Transaction Parties." A digitally displayed transactional flash card allows one first party user to order an item from at least one second party without the use of spoken language. The computer application consists of an executable program, a database of transactional flash cards and a user profile, all of which are located in the memory portion of the computer. The executable program allows the first party user to interact with the database, create his/her preferences and make notes on digital transactional flash cards. It also allows first party users of an electronic device with this computer application installed on it to interact via the Internet with each other, by sharing digitized notes, digitized images and other digitized material related to the digital, transactional flash cards.

SUMMARY OF THE INVENTION

In one embodiment of the invention, an electronic device uses a computer application allowing the display of digital, transactional flash cards on electronic screens, which can be viewed by several parties. Therefore the invention extends the use of transactional flash cards by allowing the display of digital transactional flash cards on screens of electronic devices. Also digital, transactional flash cards have additional features to the transactional flash cards such as:

With today's data storage capacity there is almost unlimited storage of digital, transactional flash cards in a database of the electronic device without increasing the weight or size to the device, With the access of most electronic devices with computers to the Internet one first party user can connect to other first party users by posting comments about items displayed on the digital, transactional flash cards on a website and allowing for other first party users to read them.

The computer application on the electronic device can contain a navigational system allowing for easy selection of a desired digital, transactional flash card, through an alphabetical listing or through other thematically listed groups. This allows the first party user an easy search and selection process of all the digital, transactional flash cards that are stored in the computer's database and can be numerous.

Several of the above groups can be cross-referenced which allows the first party user an even easier search and selection process.

Many electronic devices allow audio playback. This can be used for the playback of names of an item displayed on a digital, transactional flash card to the second party in the second party's language. This alleviates the first party user from having to learn, speak or pronounce a word in the second party's language.

Computer applications on electronic devices allow for the easy linking of additional pages to a digital, transactional flash card. They allow for the display of the information contained on one printed transactional flash card on several pages of a digital, transactional flash card on the same digital screen of the same electronic device. This has several advantages. For example, the electronic device has a very small digital screen the first page will only contain the name of the item in the second party's language, a translation into the first party user's language and a few icons. One icon will lead for example to the text describing the item. Another icon enables the first party user to add a specific digital, transactional flash card to the list of favorites stored in the user profile of the memory portion of the computer. Yet another icon will allow the first party user to go back to the start of the search in the navigational system. Also any text, such as descriptions on items, help pages etc., that don't fit onto one page on the electronic screen can be broken up into several pages or can be scrolled up and down on the screen. Linking screens and pages solves all space limitations in terms of fitting longer descriptions of dishes etc. onto a small screen of any electronic device.

Digital transactional flash cards can be computer generated solely, meaning that the image, design and layout of the transactional flash cards are created digitally on a computer; or they are created by digitizing transactional flash cards by scanning or any other method, making them displayable on a computer. They may also be created by a mix of computer generation and digitization. As the transactional flash cards, the digital, transactional flash cards include at least the ordering directions in the second party's language and the description of the item to be ordered in the first party's language as well as an image of the item.

The electronic device is preferably a handheld digital device of palm size or smaller, but can also be stationary and bigger. It preferably contains a computer portion, a screen, in/out put hardware and in/out put audio capabilities. The term "computer" includes, without limitation microchips. The handheld electronic device can be a Personal Digital Assistant (PDA), a cellular phone, a hybrid between a cellular phone and a PDA, a Game Boy or any other electronic device.

The computer application can be entered into the computer by any means known in the field such as removable media, wire transfer, wireless transfer or any other method. It can be installed through an installation disc or an installer can be downloaded from the Internet, or any other method known in the trade.

The computer enabling the display of a digital, transactional flash card on the screen of electronic devices preferably includes an input and output (I/O) portion, a central processing unit (CPU) and a memory portion. The input and output portion may include, without limitation, a keyboard, a mouse, a trackball, a touch screen, a microphone, a modem, a memory stick, a CD/DVD drive in any quantity or combination. The screen can be a LCD (liquid crystal display) screen, a plasma screen, a LED (Light emitting diode) screen or any other screen capable of displaying text and imagery. The CPU portion can be any computer-processing unit from a singular microchip to extensive configurations, either one of them handling the actual processing of electronic data. The memory portion may include, without limitation, random-access memory, read-only memory, etc. and the storage memory can be in form of a built in hardwired drive or any removable memory storage media.

The memory portion contains an executable program of the application. Upon request by the first party user for a specific, digital, transactional flash card the I/O portion will forward the request to the executable program which in turn will call from a database in the memory portion for a digital, transactional flash card and forward it into the CPU which will enable it to display on the screen.

The memory portion includes besides the executable program, a database and an interactive user profile. The database contains the digital, transactional flash cards, digital sound files of the names of items pronounced in the second party's language, and other digitized material related to the digital, transactional flash cards. The user profile may contain digitized notes taken by the first party user that are related to a specific digital, transactional flash card, and picks and favorites of some digital, transactional flash cards from the database. The executable program controls via an interface in the I/O portion the interaction between the database and the user profile.

In one embodiment of the invention, the computer has Internet-access through direct wireless or wired access, or indirect access via another personal computer. Through this Internet access the first party user is able to download further digital, transactional flash cards or digitized notes from a website or any other source. Once they reach the electronic device the executable program adds them to the database or user profile in the memory portion.

In another embodiment of the invention the electronic device has Internet access as described above and the computer application may be configured for the first party user to interact with other first party users of the computer application. The ability to interact allows first party users to share their digitized notes on the items described on the digital, transactional flash cards. This happens in the following way: a server is set up on a website or any other sharing facility on the Internet which can host digitized notes or any other digitized material that is useful to be shared by various first party users. One first party user can post his/her notes on this server. Another first party user can then download this note from the website and can as well post his own note and so on. In more technical detail this process works in the following way: to post a note on the website, the note which was created by a first party user on his/her electronic device has to be retrieved by the executable program from the personal profile of this first party user and then transferred through the I/O portion via the Internet to the website. To download a note from the website another first party users has to visit the site and through the executable program in his/her computer send a command to retrieve the desired note into her/his database. Depending on the capability of the server, millions of digitized notes—in written, drawn or photographic form—on specific items described on transactional flash cards can be hosted and shared between just as many first party users.

There are no electronic devices with computer applications in existence today that allow the display of digital, transactional flash cards to at least two parties and audio playback of names in the second party's language on electronic devices. Similarly, no device with an application that lets several first party users of such an application share notes between each other is available. There is a need for such an electronic device with such an application which will enable for example a traveler in a foreign country with the aid of for example a handheld computer make a transaction with a vendor from such a foreign country without having to speak a word in the foreign language.

Thus, a method is provided for enabling communication between at least one first party and at least one second party comprising the steps of: providing an electronic device adapted to display at least one transactional flash card comprising a first text understandable to the first party and a second text understandable to the second party and an image, wherein both texts describe the image; wherein the first party presents the at least one transactional flash card to the second party; and wherein a transaction is communicated to the second party when the second party views the transactional flash card.

The first party may further select a transactional flash card for display from a plurality of flash cards stored in a memory in said electronic device. The texts describing the image further may describe an intent to perform a transaction. Additional information also may be provided as text understandable to only the first party. The display further may comprise at least one icon containing condensed information concerning the transaction. The first text and the second text may contain an inquiry concerning the price of a transaction. The first text and the second text may also contain an inquiry concerning a particular form of payment.

The electronic device may further comprises interactive hardware, and the first party may use the interactive hardware to enter into the device comments or notes concerning a transaction to be performed using the transactional flashcard. As non-limiting examples, such interactive hardware may comprise a stylus or a touchpad.

The electronic device may further be adapted to accept removable memory media, and may allow the first party to display information stored in the removable memory media. This information may be viewable also by the second party. The electronic device further may be adapted to connect to the Internet, and may be capable of transmitting and receiving transactional flash cards from the Internet.

The electronic device may be adapted to allow the second party to enter into the electronic device a monetary amount corresponding to a second party currency, the device further configured to allow the first party to convert the entered second monetary amount into an amount corresponding to a first party currency. The device may further be adapted to connect to the Internet to obtain a current exchange rate.

The method of claim 1, wherein the electronic device is a personal digital assistant, cellular telephone, Game Boy or any other appropriate electronic device known in the art.

A method is also for enabling communication between first and second parties comprising the steps of: providing an electronic device adapted to display at least one digital transactional flash card comprising a first text understandable to the first party and a second text understandable to the second party and an image, wherein both texts describe the image; storing a plurality of transactional flash cards in memory of the device for display on at least one screen of the device; and storing a user profile created by the first party in the memory. The user profile may comprise a list of the first party's favorite digital transactional flash cards. The user profile may also contain comments entered by the first party, and it may also comprise at least one note entered by the first party.

The electronic device may be adapted to send and retrieve other first party user profiles from the Internet. The plurality of digital transactional flash cards may further be sorted into groups. The device may further have a navigational system comprising a plurality of cross-linked pages that allow the first party to select the stored flash cards from a plurality of cross-referenced groups. The navigation system may have several programmed actions that assist the first party in moving through the selection process.

A method is provided for enabling communication between at least one first party user and another first party user, comprising the steps of: (a) providing a first electronic device having a display, the device adapted to store a plurality of digital transactional flash cards in a memory so that at least one flash card may be viewed on the display; (b) selecting at least one digital transactional flash card from the memory; (c) displaying the at least one digital transactional flash card comprising a first text understandable to the first party and a second text understandable to the second party and an image, wherein both texts describe the image; and (d) enabling one first party to communicate with another first party user of a second electronic device adapted to store a plurality of transactional flash cards in a memory by exchanging stored digital transactional flash cards between the first and second electronic devices. The at least two first parties may have stored user profiles in the memories of the first and a second electronic devices, and step (d) may further comprise the step of exchanging user profiles between the first and second electronic devices.

The user profiles of the at least two first parties may be sent by the at least two electronic devices to an exchange facility on the Internet from which they can be retrieved or viewed by other first parties. At least one first party may have stored user profiles of other first parties in the memory of at least one electronic device. At least one electronic device may comprises a camera, and the first party users may exchange notes in form of images taken by the camera.

In another embodiment the second party may also have an electronic device that can interact with the first party's electronic device via infrared or radio frequency, or blue tooth technology or any other wireless or wired technology known in the art. In this manner, the first party can, after presenting at least one digital transactional flashcard to the second party, transmit (beam) using the above cited technologies a list of the presented digital transactional flashcards to the second party's electronic device. The first party may then select this list of picks of digital transactional flashcards before entering a restaurant. Also the first party can beam a price inquiry to the second party who can then beam back an itemized bill with a total. That the second party may have an electronic device capable of interacting with the first party's electronic device is of advantage in several situations such as for example when the first party communicates a large order of items with the digital transactional flashcards, for example, for several people, and the second party then, having seen and understood the items that the first party desires, would not have to write the large order down. Another advantage may be faster communication because the beaming of the list of items on the digital transactional flashcards to the second party may happen almost instantaneously. Beaming a list of transactional flashcard to the second party will not change the spirit of the invention but simply allows the list of transactional flashcards to be displayed on another electronic device.

BRIEF DESCRIPTION OF THE DRAWINGS

The features and advantages of the present invention will become more readily apparent from the following detailed description of the invention in which like elements are labeled similarly and in which.

DETAILED DESCRIPTION OF THE INVENTION

The preferred embodiment discloses a method of performing a transaction between a first party who understands a first language and a second party who understands a second language, where the communication impediment between the two parties is that the two parties don't understand each other's language. Several other impediments in communicating the intent to perform a transaction may exist, such as, for example, where the physical noise level is too high for them to hear each other; or where to the first party a trade specific terminology might be meaningless or hard to remember, but without it a transaction couldn't take place because the second party requires the goal of the transaction to be described with that specific terminology. Having shown further communication impediments we in no way mean to limit the invention to the description of the preferred embodiments, and from other applications for the claimed device may arise from numerous other communication impediments.

The disclosed method obviates the need for the first party user to learn, speak or even pronounce a foreign language to describe the goal and the intent of a transaction because the electronic device displaying the digital transactional flash cards themselves communicate the desired transaction clearly with a second party who does not speak the language of the first party. The digital transactional flash cards allow the user to perform the transaction without the first party user having to communicate in any other way with the second party.

The following terminology will be referred to throughout this description. The first party (hereafter referred to as "user") refers to the person possessing the transactional flash cards. The user may, for example, be a traveler to a foreign country, but there are many applications for the digital transactional flash cards in the user's homeland, especially in today's multicultural cities. Additionally, communication difficulties are not limited to language difficulties alone therefore other uses might arise from any situation where two parties have difficulties understanding each other (e.g. a high noise level where speech is difficult or impossible; or a very technical, specialized language in which only one party is versed; or any other situation where two parties have difficulties communicating.)

The term "second party" includes any person or group of persons who do not understand the user and who the user tries to transact with by communicating the goal and the intent of a transaction through use of the transactional flash cards. It should be noted that the user will most likely be the initiator of a transactional communication, however, he or she might also be approached by another party and may then use the digital transactional flash cards to communicate. Typical second parties might be merchants, waiters or any other persons who are approached by the user or are offering to sell a product to the user; or an agent who is providing an experience that the user intends to see, or be part of etc.

The term "transaction" describes an exchange between two parties. The digital transactional flash card performs a transaction for its user because it describes three aspects of this transaction: 1. its goal, 2. the intent of the parties to perform the transaction and 3. informs the parties of the goal of the transaction. A goal could be a purchase of a specific product, with the description of the intent being the description of the intent to purchase the same product with a phrase such as: "I would like to buy." The first two aspects of the transaction are written in both the user's and the second party's language. The third aspect, providing information on the goal of the transaction might comprise additional detailed background information on the product or service in the user's language. This would be particularly helpful, for example, where such a product or service does not exist in the user's country. There are a myriad of goals of transactions with their suitable description of the intent to achieve that goal and information on these various goals. Some examples of descriptions of the intent are verbs like: to purchase, order, buy, acquire, see, be part of etc., all with the goal being the provision of a service or consumable item, entertainment, an experience etc. The description of the goal would be a description of that service, or consumables item, entertainment, experience etc.

The communication with the second party is twofold: textual and visual: (a) textually the flash cards communicate the name describing the goal of a specific transaction together with a phrase describing the intent to achieve this goal written in the second party's language in its idiomatic characters which are prominently displayed on the digital transactional flash card; and (b) visually an image of the goal of the specific transaction is displayed on the digital transactional flash cards.

The information, which the digital transactional flash cards convey to the user, is also textual and visual: (a) text is displayed on the digital transactional flash cards in the card holder's language. This text may be displayed in smaller type than the name of the product. The text information may include a description of the goal of a specific transaction characteristics such as materials, ingredients, time needs etc. In addition, a navigational system comprising small icons may be provided on the face of the digital transactional flash card to quickly give the user general information while using less written text. This is important because space limitations may exist with the transactional flash cards. For example when the goal of the transaction is the purchase of a product, small icons might tell the first user the price ranges and what forms of payment are accepted; (b) an image of the goal of the transaction will also be readily understood by the card holder.

The digital transactional flash cards may be displayed on the screen of any portable electronic device such as a personal digital assistant (PDA). Currently available PDAs, such as those sold under the trade names "Palm Pilot®" (Palm, Inc.), or "Jornada®" (Hewlett-Packard), and "IBM Workpad®" (IBM) are capable of running various calendar, address book, or memo pad applications that may be used to create and store short documents. Some PDAs also have wireless-communication capability that permits them to transmit and receive data via a wireless network. The wireless connection may be used to transmit and receive many different types of information. For example, many wireless-enabled PDAs comprise a Web browser to permit the user to download and display Web pages from the Internet. Others use the wireless connection to transmit and receive e-mail. Another use of the wireless connection is to download applications to the PDA. A number of available PDAs permit users to load various applications adapted to perform specific tasks. The specific type of portable electronic device on which the transactional flash cards will be displayed is not critical. In addition to PDA's, a non-limiting listing of examples of such other electronic devices may include cellular telephones, satellite telephones, two-way telephones, GameBoys, Blackberry's or other e-mail receiving devices, personal computers, electronic watches having video and/or audio display capabilities, and any other appropriate wireless or hard-wired electronic communication or display devices."

Figure 1:
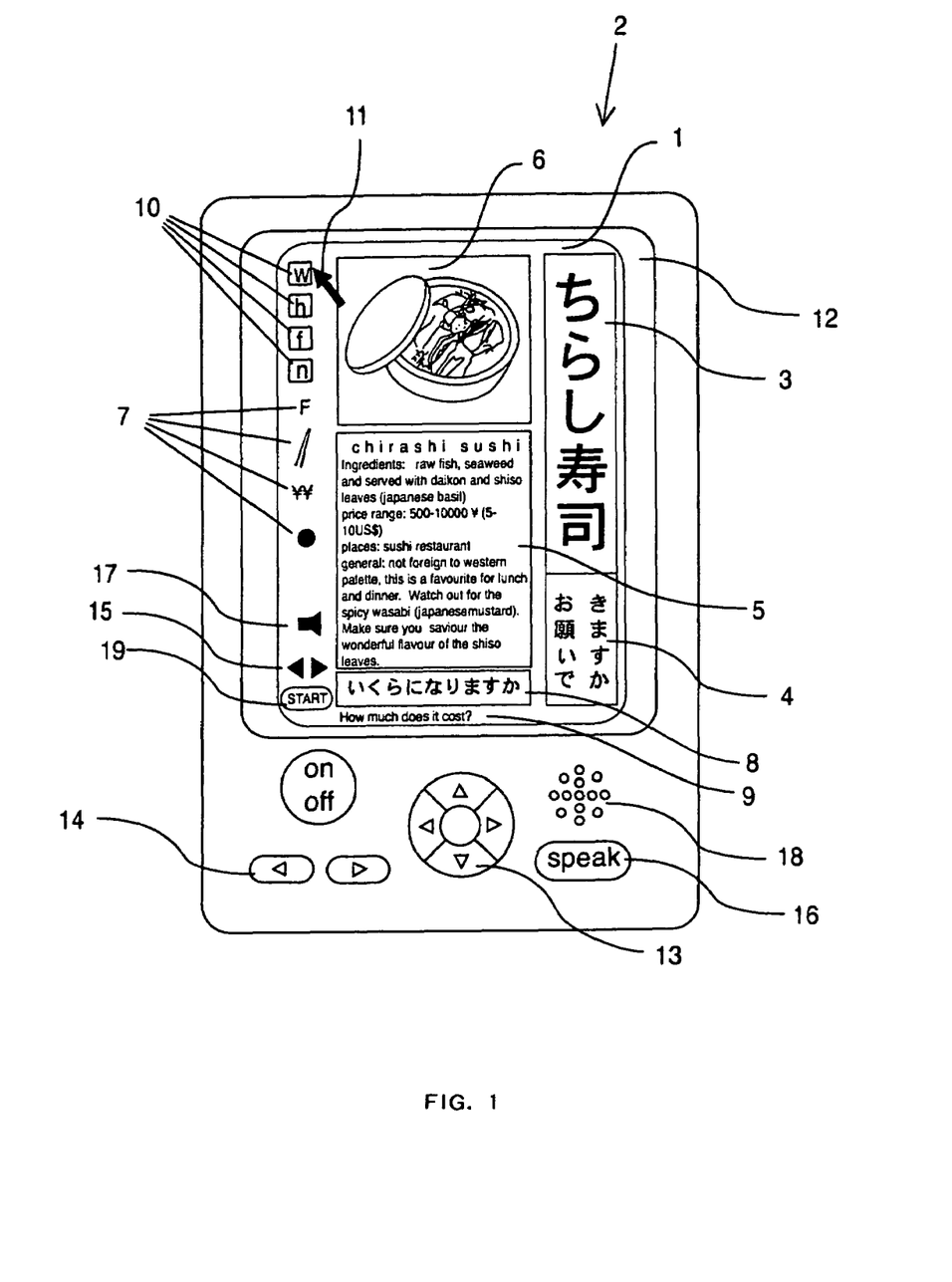
FIG. 1 shows a digital, transactional flash card displayed on a handheld electronic device.

Referring now to the drawings, FIG. 1 shows a digital, transactional flash card 1 displayed on a PDA 2. The situation chosen for this embodiment of the invention is an English speaking traveler (first party user) in Japan ordering a food dish (item), Chirashi Sushi, from a Japanese waiter (second party) with the use of a digital, transactional flash card. This embodiment in no way limits the scope of the invention that can be used in many other situations, other language combinations as well as with other items than food displayed on the digital, transactional flash card. The digital, transactional flash card 1 as shown in FIG. 1 includes at least:

ordering directions in Japanese consisting of the name of a food dish,

Chirashi Sushi 3 and a phrase 4 expressing the wish to acquire it, and the description 5 of the dish in English, as well as an image of the dish 6.

Additionally displayed are small icons 7 which give the traveler specific categories of quick information without having to read the whole description. A question 8 is displayed in Japanese that inquires the price of the dish from the waiter. In smaller type the question is repeated in English 9 helping the traveler remember what the question 8 displayed in Japanese is saying. Four small screen buttons 10 with letters which when touched with a cursor 11, or any other suitable device such as a stylus etc., will perform different tasks such as create a link to a website, or open a help page, or select the dish as a favorite, open a screen page where a traveler can make a note.

The digital, transactional flash card 1 can be displayed covering part of the screen 12 of the PDA 2 as displayed or can also be designed covering the whole screen 12. When covering the screen only partially the user has the option to display or work on other things while displaying the digitized, transactional flash card. None of these display options changes the spirit of the invention. There are also hardware buttons on the shell of the PDA that allow the traveler to navigate the application and interact with the digital, transactional flash cards. There is a four-directional button 13 that can control a cursor or scroll down lists. There are two directional buttons 14 which perform the same task as two screen arrows 15, both of which can be used to move from one digital, transactional flash card to the next and back. There may also be a voice activation button 16 which performs the same task as the screen button 17 which when pressed will prompt the PDA 2 to playback the name of the dish in Japanese through the speaker 18. A "START" textbox 19 will allow the traveler to get back to the beginning her/his search as described in the text accompanying FIG. 2 describing the navigation of the computer application.

The interactive hardware on various computers can be arranged differently and can have different shapes without changing the spirit of the interaction of this control hardware with the computer application described in this invention. For example the four directional button 13 can be a little joystick or a track ball or any other piece of control hardware.

Figure 2:
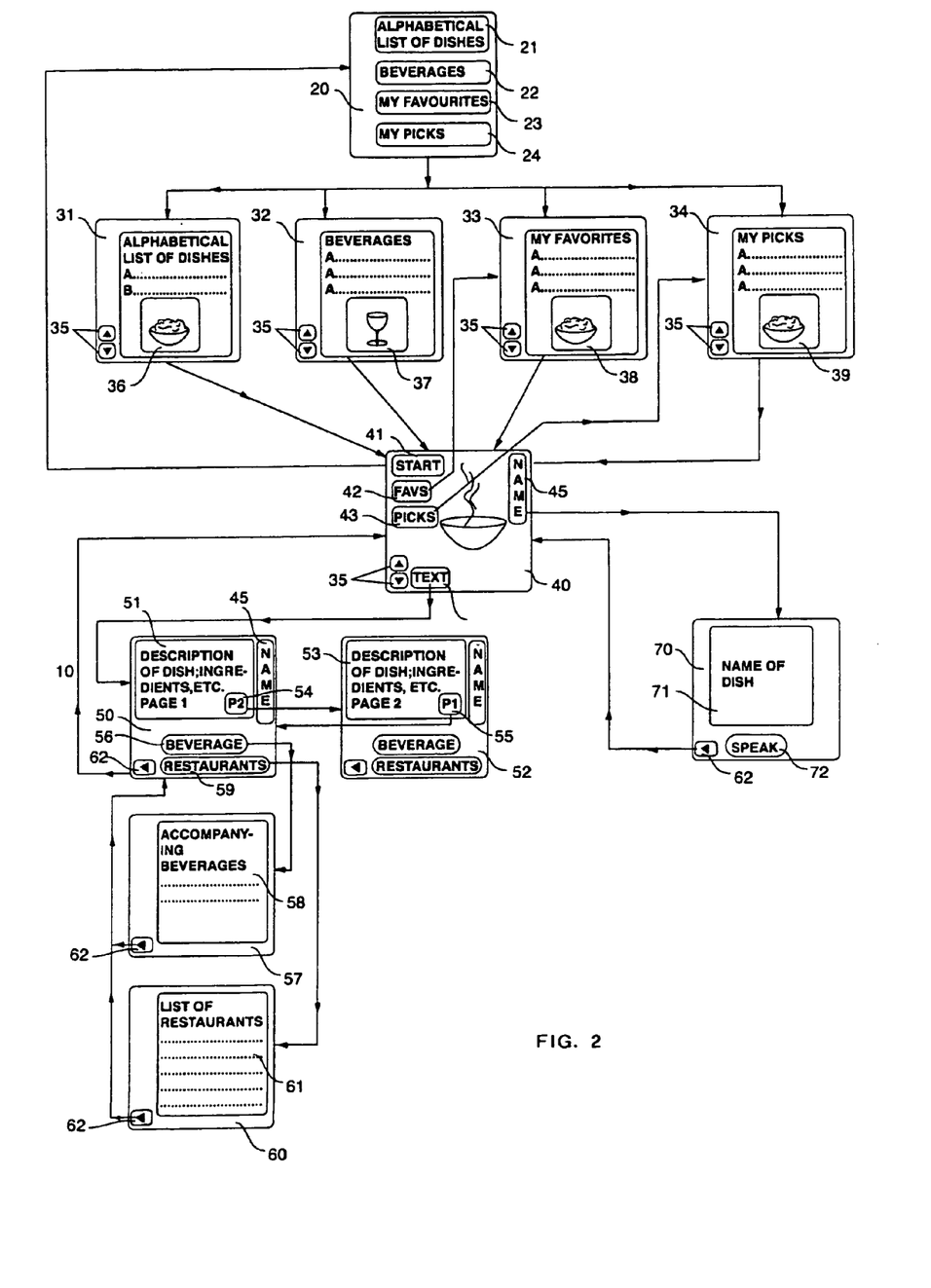
FIG. 2 is a schematic diagram of the basic navigational system of the computer application.

FIG. 2 shows a schematic drawing of the main navigation of the application. The navigation is presented here as a series of screen images that are inter-connected by active screen areas. Active screen areas can be screen buttons, text fields, pull-down or pull-up screens, images or any other area that when selected will perform a task. Selection can be performed off screen by a cursor, which is managed by a mouse, a directional key on the keyboard, the tab key in case of lists, a joystick, or any other piece of hardware that can move the cursor and make the selection. Touch screens allow for direct interaction with the screen by making a selection with a stylus or even the fingers. The tasks performed can be various such as switching to another screen, opening up a pull-down menu, connecting to the internet, telling the PDA to pronounce a name of a dish, etc. The lines with the arrows indicate the movement from one screen to another and which active screen areas are pressed to perform that movement.

In this embodiment of the invention, the application opens up after maybe getting past some self-promotional material to the opening screen 20 of the navigation. The opening screen 20 gives the user four options in form of four text fields 21–24. Tapping the field 21 will lead to the screen 31 that displays a list of all the dishes in the database of the application. In the same way tapping the text field 22 will lead to a screen 32 displaying a list of all beverages. Tapping either the text field 23 or 24 will lead to screen displaying a list of the favorites 33 or a list of picks 34, respectively. These two lists on the screens 33 and 34 are changing lists and are selected by the user. The screens 31 through 34 have up and down buttons 35 allowing the user to scroll up and down in the list. The scrolling through this list or any of the following lists could also be programmed to be accessible with the four directional button 13 or the two directional button 14 of FIG. 1. From any of the screens 31 through 34 you can get to an individual digital, transactional flash card displayed on screen 40 by either tapping on the name on the list or any of the images 36 through 39 or tapping the four directional button 13.

The screen 40 displays the digital, transactional flash card in a slightly different way than the printed flash card because of the option of attaching linked screens. The text describing the dish is displayed on such a linked screen 50. Linking the screens has several advantages: If the digital device is a cell phone with a relatively small screen space can be saved by displaying the communication to the Japanese waiter on a separate screen than the description of the dish for the traveler. Also by linking screens together the description of the dish can be more detailed by linking several pages of that description text. The technology allows the digital, transactional flash card to be displayed on separate screens. These linked screens form one integral digital, transactional flash card that is used in the same way as the printed transactional flash cards.

The screen 40 has several active areas: tapping the "start" textbox 41 will return the user to the opening screen 20. Tapping the "favs" textbox 42 or the "picks" text box 43 will enter the displayed dish into the respective list namely the favorites list on screen 33 and the picks list on screen 34. The "text" textbox 44 will lead to a separate screen 50 that displays the description of the dish. Touching the "name" text box 45 will lead to a screen 70 with the name 71 displayed even larger in Japanese with a "speak" text box 72 which will prompt a recording of name of the dish pronounced in Japanese in the data file to be played back on the speaker 16 of FIG. 1.

Figure 11:
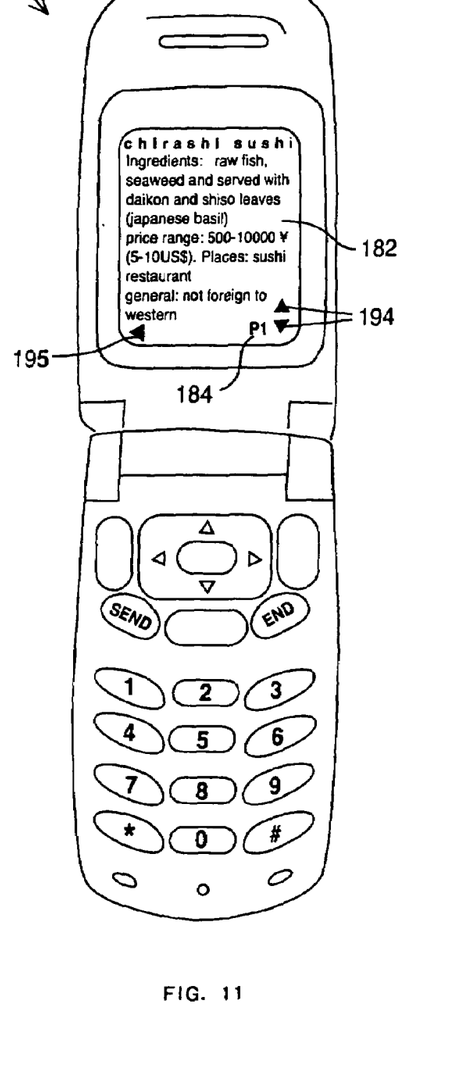
FIG. 11 shows a digital, transactional flash card displayed on a small screen of a cellular phone showing the second page of the same digital, transactional flash card as in FIG. 10.

The screen 50 appears when, as stated above, the "text" textbox 44 is tapped and it holds a description of the dish in English 51. In this case not the whole description fits onto the screen 50 so a screen 52 has been created to hold page two 53 of the description. To get from page one to page two of the description an active screen area 54 displaying "p.2" within page one of the description 51 can be tapped. In reverse an active screen 55 displaying "p.1" will lead from page two of the description 53 back to page one 51. This process could be repeated to feature descriptions that are more than two pages in size. A scrolling feature as shown in FIG. 11 could also be used to accomplish this task. Additionally the screen 50 and 52 may have a "beverage" text box 56, which may open a screen 57, that displays names and descriptions of beverages 58 that would accompany the dish well. A "restaurants" text box 59, when tapped, may lead to screen 60 that can contain a list of restaurants 61 that serve this dish. This page can also contain web links to the restaurants on list 61. Screens 50, 52, 57, 60 and 72 also contain an active screen area 62 with an arrow that when tapped will lead from the respective screen back to the previously open screen.

Figure 3:
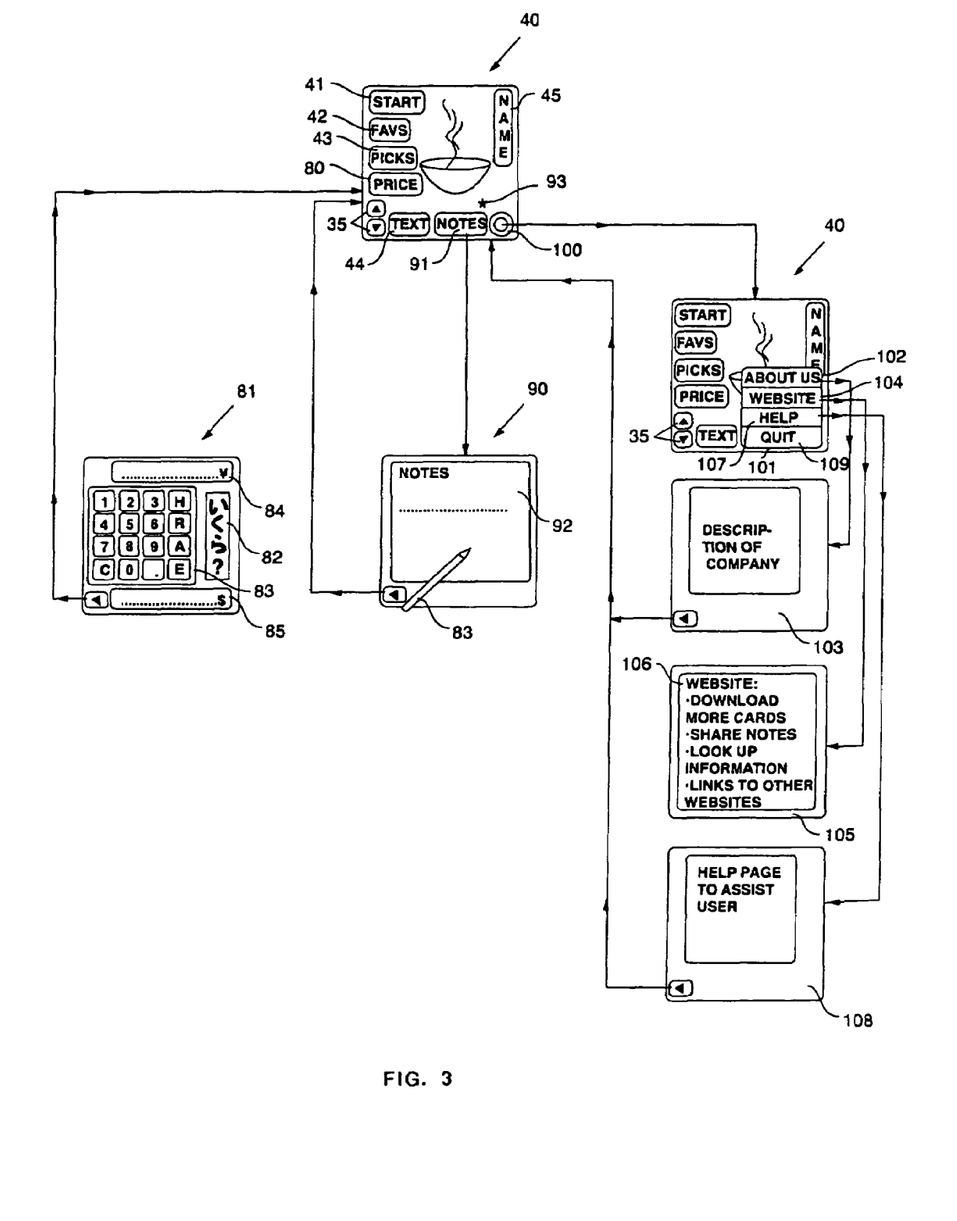
FIG. 3 is a schematic diagram of additional features to the navigational system of the computer application.

FIG. 3 shows the same digital, transactional flash card with additional features such as price inquiry with currency conversion, personal notes pages, website link, help pages, information of the company making the transactional flash cards as well as a "quit the application" button.

The text box "price" 80 when tapped leads to a screen 81 which displays a digital, transactional flash card that features a price inquiry 82 in Japanese combined with a calculator display 83. On the screen 81 there is also a window 84 for the price in the Yen amount for the dish and a window 85 for the corresponding US Dollar amount. On the calculator display there are for additional screen buttons "H," "R," "A" and "E." H stands for help, R for rate of exchange, A for auto update of rate through Internet and E for exchange. This transactional flash card inquiring about the price of a dish is used by a traveler in the following way: First the traveler sets the exchange rate by pressing first R, then taps the Dollar bar 85, then enters "1" on the calculator display 83 which will display the "1" on the Dollar bar 85. Then he taps the Yen bar 84 and enters how many Yen to a Dollar on the calculator display 83. By pressing R again the exchange rate is set. The process can also be reversed by entering the amount of Dollars per Yen. If the electronic device has an Internet connection the exchange rate can also be automatically set by pressing the button "A" which connects the device over the internet to an institution or a website that supplies the handheld device with continuous updates on exchange rates. The continuous update can also be fully automated whereby no pressing of a screen button is necessary. Once the exchange rate is set, the waiter can enter the Yen amount of the dish into the Yen bar 84 via calculator display 83. Then the traveler taps the E button and the price for the dish will be displayed in a Dollar amount in window 85. It is obvious that with any other currencies instead of Yen and Dollars this transactional flash card can be used in the same way. What distinguishes this currency converter from other currency converters is that it is able to interact with the Japanese waiter by asking the for the price of the dish by displaying the question 82 in Japanese and letting the waiter type in the price for the dish.

Additionally the digitized transactional flash card features a notes page 90 for each dish allowing the traveler to take his/her personal notes. Tapping the "notes" text box 91 accesses the notes page 90. On an interactive screen area 92 the traveler can write and edit text such as notes on the dish, likes and dislikes, restaurants where she/he had the dish etc. When returning to the digital, transactional flash card of the dish 40, a little icon 93 will indicate that a note has already been taken, accompanying the digital, transactional flash card 40. This note can be reviewed and edited by tapping the "notes" bar 91 again.

An additional button 100 will lead to the digital transactional flash card 40 displaying a pull-up menu 101. The pull-up menu 101 gives four options in form of vertically aligned text boxes. The "About us" text box 102 leads to a screen page 103 that contains text describing the company who makes the transactional flash cards. The "Website" text box 104 leads to a screen 105, which displays the web page 106. The web page 106 is displayed on the screen 105 by means of a connection of the handheld digital device to the Internet. This connection can be made in several ways such as by modem and cable, or wireless with a cell phone or any other technology available. The web page 106 allows the user of the digital transactional cards to download more digitized transactional flash cards, share notes on dishes with other users, or look up more information on the dishes. The "Help" text box 107 leads to a screen 108 which displays instructions, common errors, frequently asked questions. The "Quit" text box 109 let's the user exit the application and resume other activities on his/her electronic device.

Figure 4:
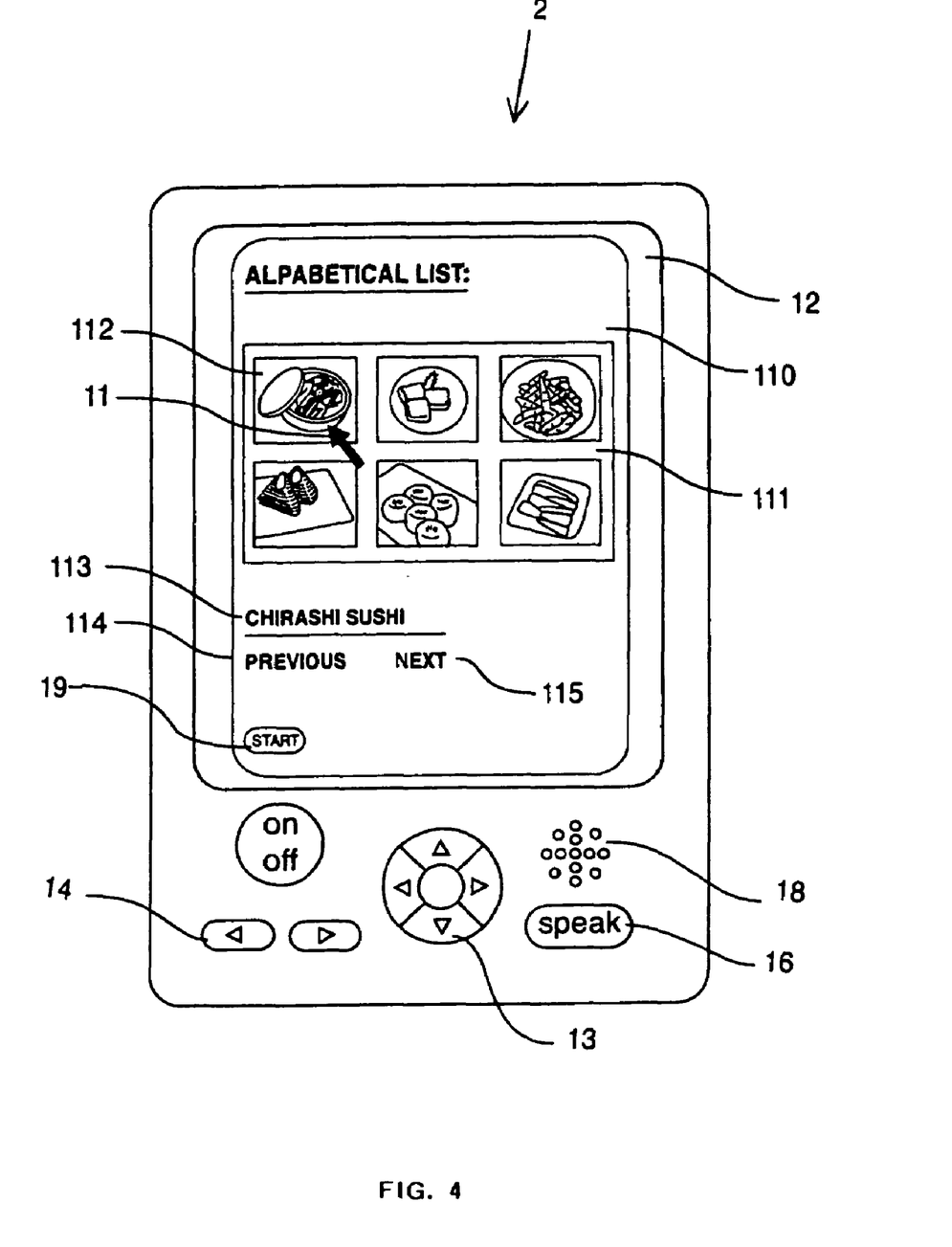
FIG. 4 shows a screen interface displaying a alphabetical list with thumbnail images of digital, transactional flash cards.

FIG. 4 shows an example of the layout of a navigational screen 110 displaying an alphabetical list of dishes, as shown in less detail on screen 31 of FIG. 2. The alphabetical list is broken up into groups of six dishes. Six smaller thumbnail images 111 are displayed per group. The name of the image selected by the cursor 11 from the thumbnail images will be displayed, as for example the name of image 112 is chirashi sushi 113. The options previous 114 and next 115 allow the traveler to move to the previous group of six dishes or the next group respectively. Once a dish has been selected the computer will display the digital, transactional flash card representing that dish such as in this example the digital, transactional flash card 1 as shown in FIG. 1.

Figure 5:
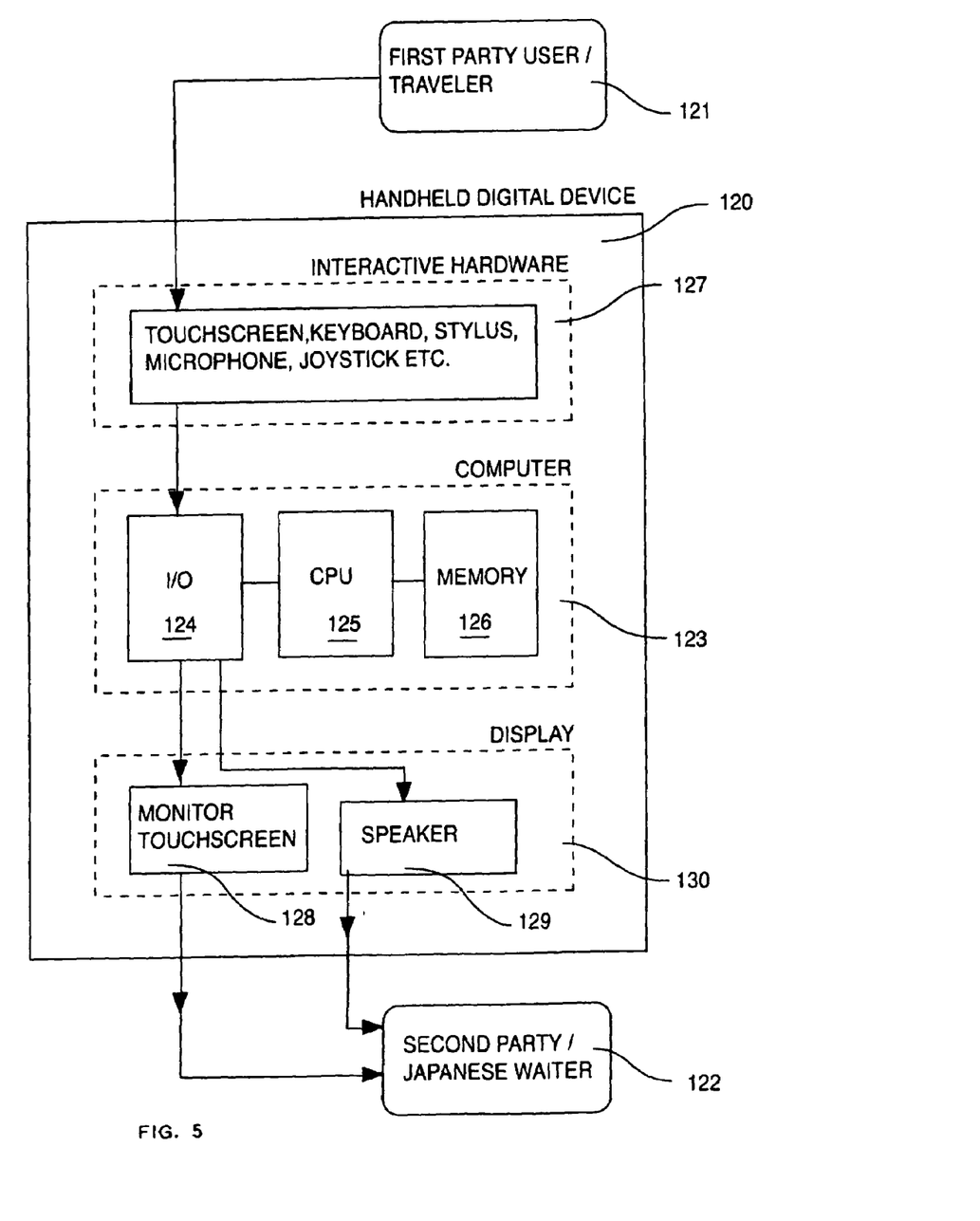
FIG. 5 is schematic diagram of a handheld electronic device in reference to a first party and second party user.

FIG. 5 is a schematic diagram showing the computer application in reference to a handheld digital device 120, the traveler or "first party" user 121 and the second party (e.g. a Japanese waiter 122).

The computer portion 123 of the digital device 120 includes an input and output (I/O) 124, a central processing unit (CPU) 125 and a memory portion 126. The memory portion 126 contains among other items the executable program 133 of the application as shown on FIG. 6. A command entered by the traveler 121 through the interactive hardware portion 127 will be forwarded to the I/O portion 124 into the CPU 125 and then to memory portions 126. From where the executable program 133 outputs a digital, transactional flash card of a dish into the CPU 125 and I/O 124 and then forwards it for display on a screen 128 and possibly for audio output on a speaker 129 of the display portion 130 of the handheld digital device 120 which the second party (Japanese waiter 122) can view or listen to.

Figure 6:
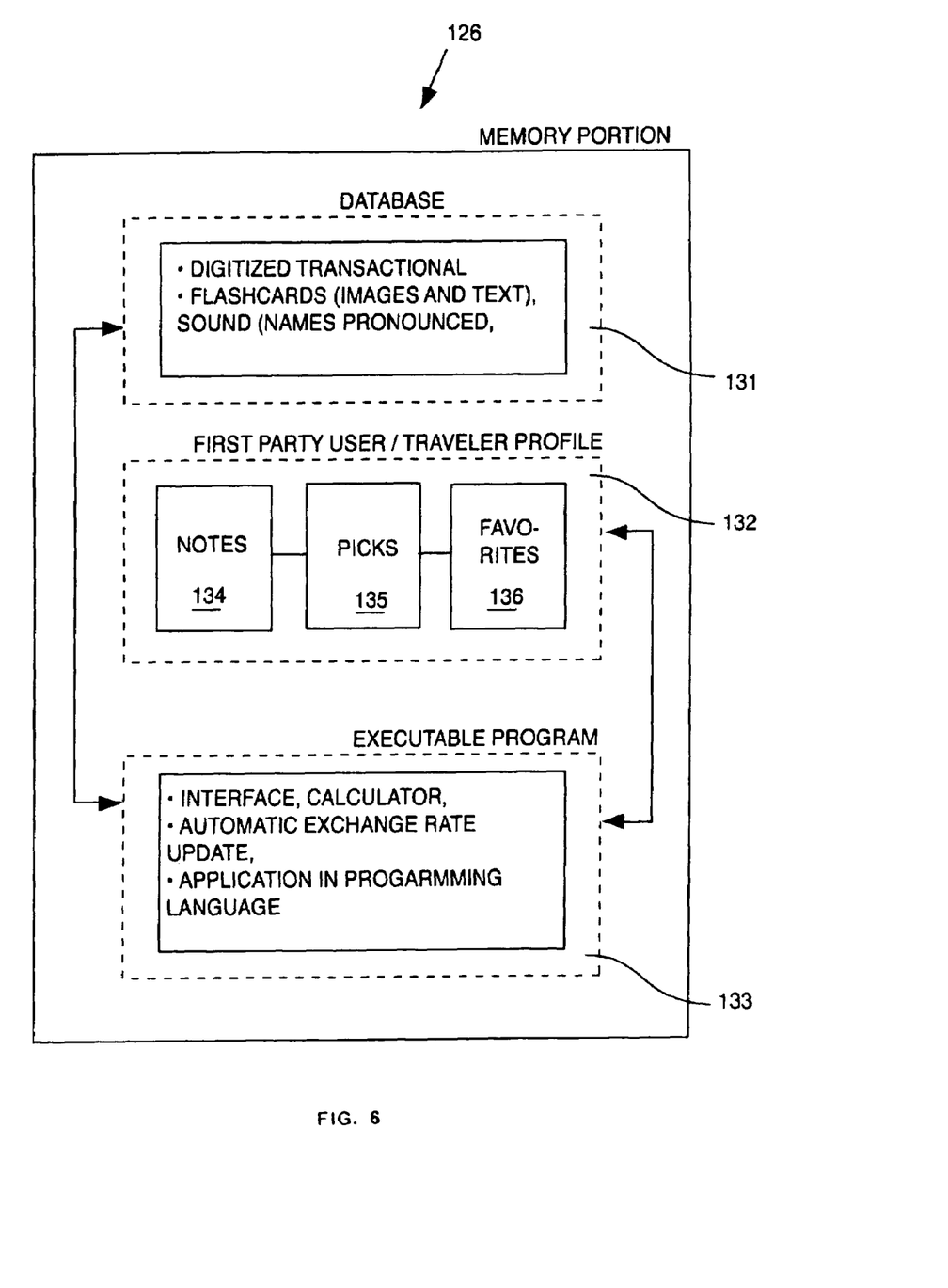
FIG. 6 is a schematic diagram of the memory portion of a computer.

FIG. 6 shows a more detailed diagram of the memory portion 126. It contains three major sections: the database 131, the traveler/first party user profile 132 and the executable program 133. The executable program 133 interacts with the CPU portion 125 and the I/O portion 124, basically taking commands, translating them into computer language and then executing the commands. The database 131 contains static material such as the digital, transactional flash cards and sound files of the dishes that can be retrieved by the executable program 133. The traveler/first party user profile 132 is a dynamic database that means that information stored in it can be changed frequently. In this portion the notes 134, the picks list 135 and the favorites list 136 are stored. The traveler/first party user profile 132 can also be accessed with the executable program 133 allowing the traveler 120 to add and subtract information.

Figure 7:
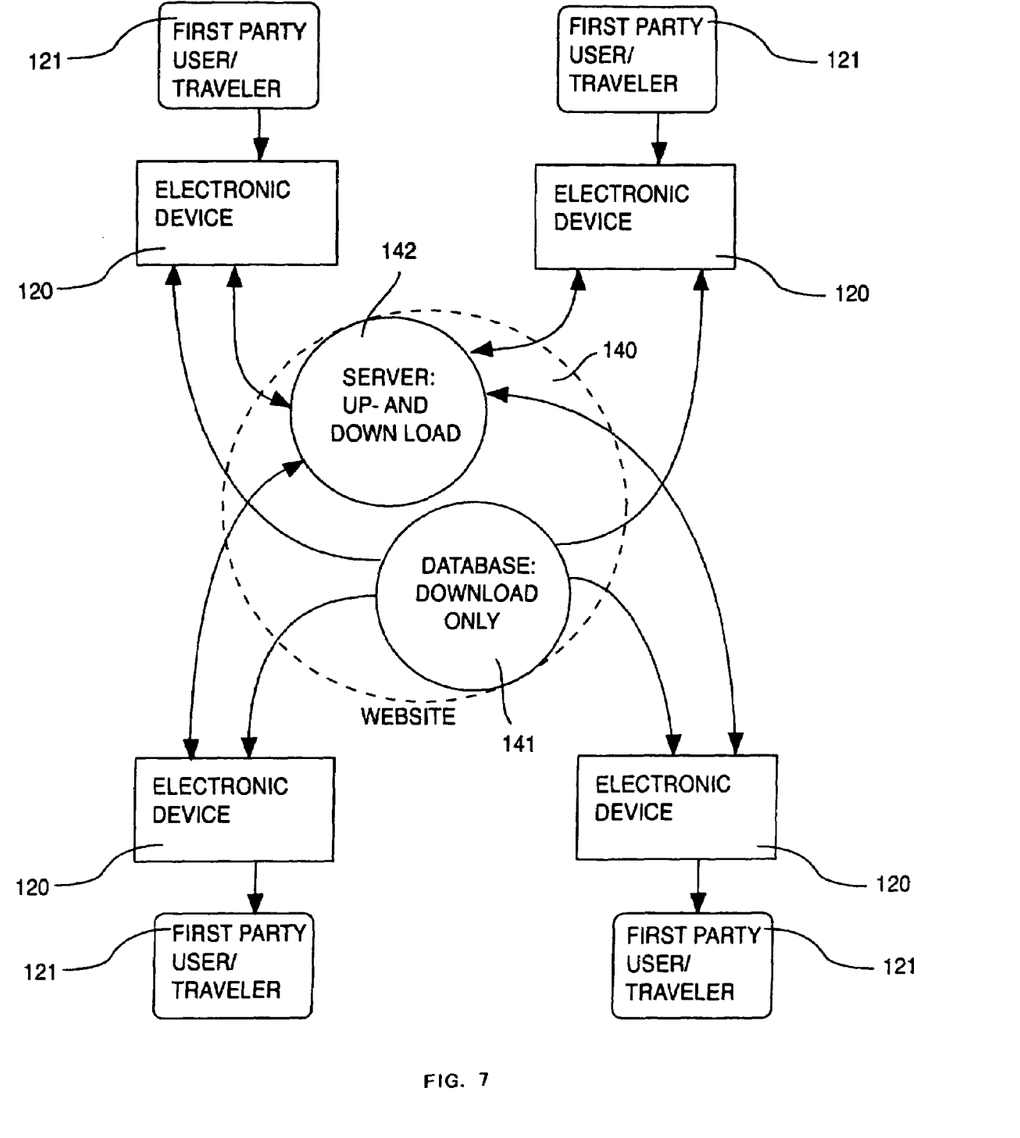
FIG. 7 is a schematic diagram showing the relationship between several handheld, electronic devices with Internet connections and their first party users, and a server on a website.

FIG. 7 shows four digital devices 120 that have Internet-access through direct wireless or wired access, or indirect access via a personal computer. Through this Internet access four travelers/first party users 121 are able to download further digitized transactional flash cards 1 from the database portion 141 of a website 140 into the executable program 133 and then into the database 131 of each device 120. FIG. 7 shows only for travelers 121 accessing the website but as known to anybody in the field almost unrestricted numbers of travelers could visit the website and download more digital, transactional flash cards. Also a payment mechanism that accepts credit cards or other payment methods, familiar to anybody knowledgeable in the field, can be set up on this website so the traveler can purchase additional, digital transactional flash cards before she/he can download them.

Also with the Internet access described above each traveler's 121 may interact with other travelers 121 by sharing their notes 92 on the dishes. For this to be possible the website has to be connected to a server 142 that can host various notes 92 which are uploaded by various travelers 121. Other traveler 121 can then visit the website 140 and download the notes 92 hosted on the server 142. This happens in the following way: For a traveler 121 to post a note 92 on the website 140, the note 92 has to be retrieved by the executable program 133 from the personal profile 132 of that traveler 121 and then transferred through the I/O portion 124 through the Internet to the website 140 and then onto the server 142. To download such a note from the server the executable program 133 of a traveler 121 will send a command via the CPU 125 and the I/O portion 124 over the internet to the website 140 which directs it to the server 142. This command will then give instructions to the server to download the desired note to the traveler 121 who wanted to read it. By a traveler visiting the website several notes 92 can also be viewed on a screen of a digital device 120. This works in the same way as described above where a command form the executable program 133 of a traveler 121 will send a command containing instructions for such viewing to the website 140. The programming necessary for the executable program 133 to send such commands can be executed by anybody knowledgeable in the field of computer programming. Depending on the size of the server millions of notes 92 on specific items described on digital, transactional flash cards 1 can be hosted and shared between just as many travelers/first party users 121.

Figure 8:
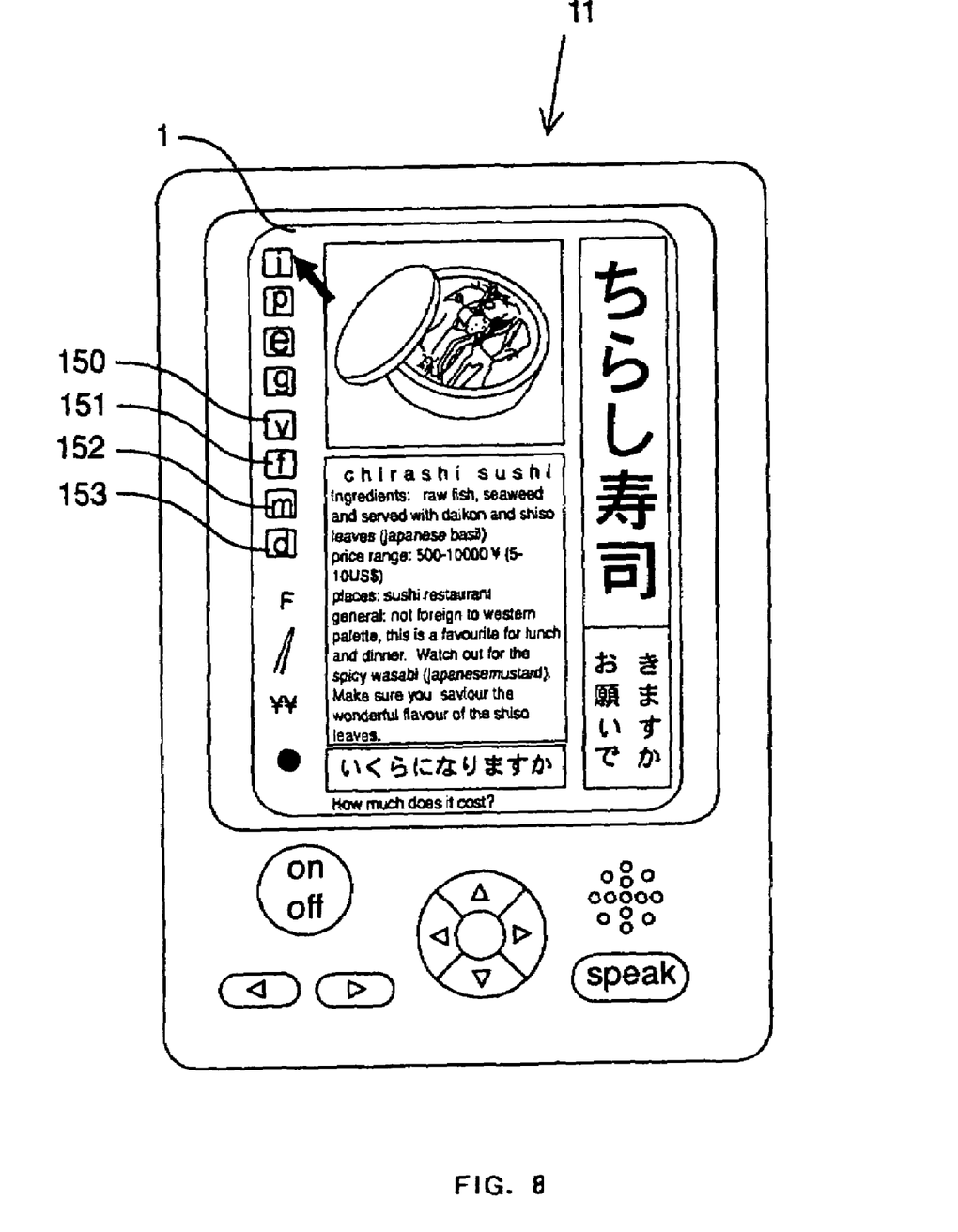
FIG. 8 shows a digital, transactional flash card displayed on a handheld electronic device with icons that lead to cross-references groups of digital, transactional flash cards.

FIG. 8 shows the same digitized, transactional flash card as FIG. 1 with additional cross-references 150 through 153. These are helpful when searching for a specific category of dishes. The categories displayed in the textboxes are "v" 150 for vegetarian dishes, "f" 151 for fish and various seafood dishes, "m" 152 for meat dishes, "d" 153 for desserts. When for example pressing "v" 150 the computer application will only display a list of vegetarian dishes and not the whole alphabetical list as displayed on screen 31. This is achieved in the following way: the executable program 133 has been programmed to know which file in the database 131 is a vegetarian dish. When selecting "v" the executable program 133 will only pull the vegetarian dishes from the database 131 and display them on the screen of an electronic device. The display of the list can be in various forms as described in the text accompanying FIG. 4. Other categories can be added such as inexpensive, medium priced and expensive; or regional foods such as only in South of Japan; or beverages such as sodas, coffees, teas, sakes etc. These categories make it much easier for the traveler to search her/his database for dishes he/she is in the mood for.

Figure 9:
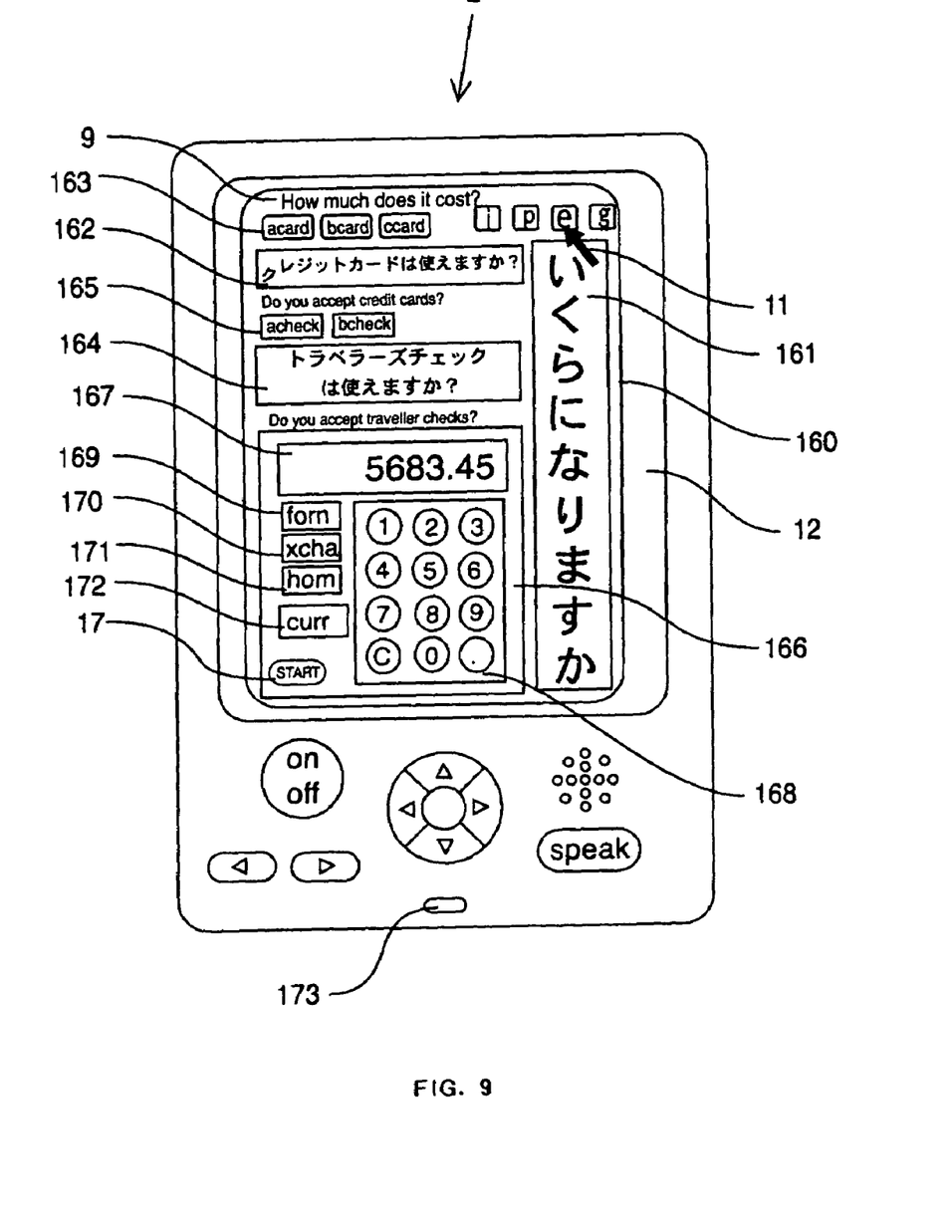
FIG. 9 shows a special, digital, transactional flash card displayed on a handheld electronic device with a currency converter.

FIG. 9 displays the digital, special, transactional flash card 160 on the screen 12 of the portable electronic device 2. The digitized, special, transactional flash card 160 displays the question about the price of the product 161 in the foreign language written with the characters of that foreign language, in this embodiment Japanese, prominently displayed. This question 161 is the same question 8 as on the transactional flash of FIG. 1, but in a more emphasized fashion. Such an embodiment is useful in the situation where there are no price tags attached to a product or service. As with the digital, transactional flash card 1 of FIG. 1, a translation of the question about the price 9 also appears in smaller type in the traveler's language. Additional questions are displayed in Japanese with a translation below in English: such as inquiries are first whether credit cards are accepted 162, using small icons of common credit cards 163 for easy identification of the credit cards; and second inquiry whether traveler's checks are accepted 164 is displayed in Japanese together with icon 165 of common traveler's check companies.

In addition this flash card 160 shows a currency converter 166 comprising of a numerical, horizontal display box 167, a numerical keypad 168 and vertical row of buttons 169 through 171. In the embodiment shown, the three buttons 169 through 171 may be used to perform the currency conversion. First the user would set the exchange rate by pressing the "xcha" button 170 once enter the rate which will display on the numerical display box 167 and then tap the "xcha" button 170 a second time to enter the rate. The rate will stay in the computer's executable program 133 until the above operation is performed again and another rate is entered. Now, the traveler would press "forn" 169 and enter the price in foreign currency, then pressing "hom" 171 would activate a programmed computation in the executable program 133 of the computer's memory 126, to produce the price in the traveler's own currency displayed in the numerical box 167. Any other acronyms than "forn", "xcha" or "hom", or two numerical boxes 167 one for the amount displayed in the Yen and the other in Dollars could be used without changing the character of this embodiment of the special digitized, transactional flash card. In this embodiment the set of digital, transactional flash cards is handling the communication between an American traveler and a Japanese waiter. But if the calculator needs to deal with more currencies (i.e. currencies of all other English speaking countries that may use the present device) then an additional button 172 could let the traveler choose his currency by tapping 172 and choosing from a pop-up list her/his native currency. Further, if the electronic device has access to the Internet, a link could be used to connect to a financial service organization that would automatically update the exchange rate for use in the above computation.

The electronic device 2 may further comprise a microphone 173 and voice recognition software to allow the traveler and waiter to speak into the electronic device and display the numbers in the numerical box 165 without entering them on the numerical keypad 166.

Figure 10:
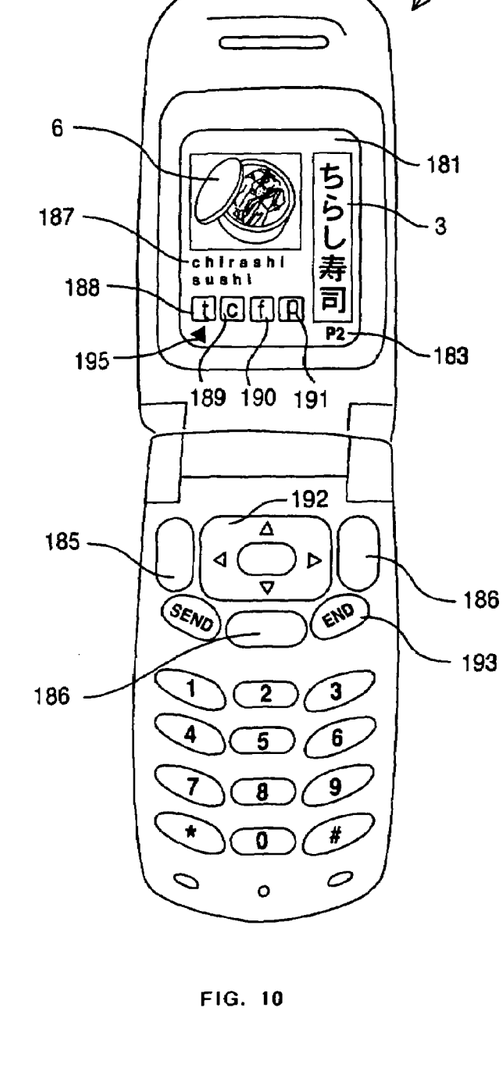
FIG. 10 shows a digital, transactional flash card displayed on a small screen of a cellular phone displaying the first page of a digital, transactional flash card.
Figure 12:
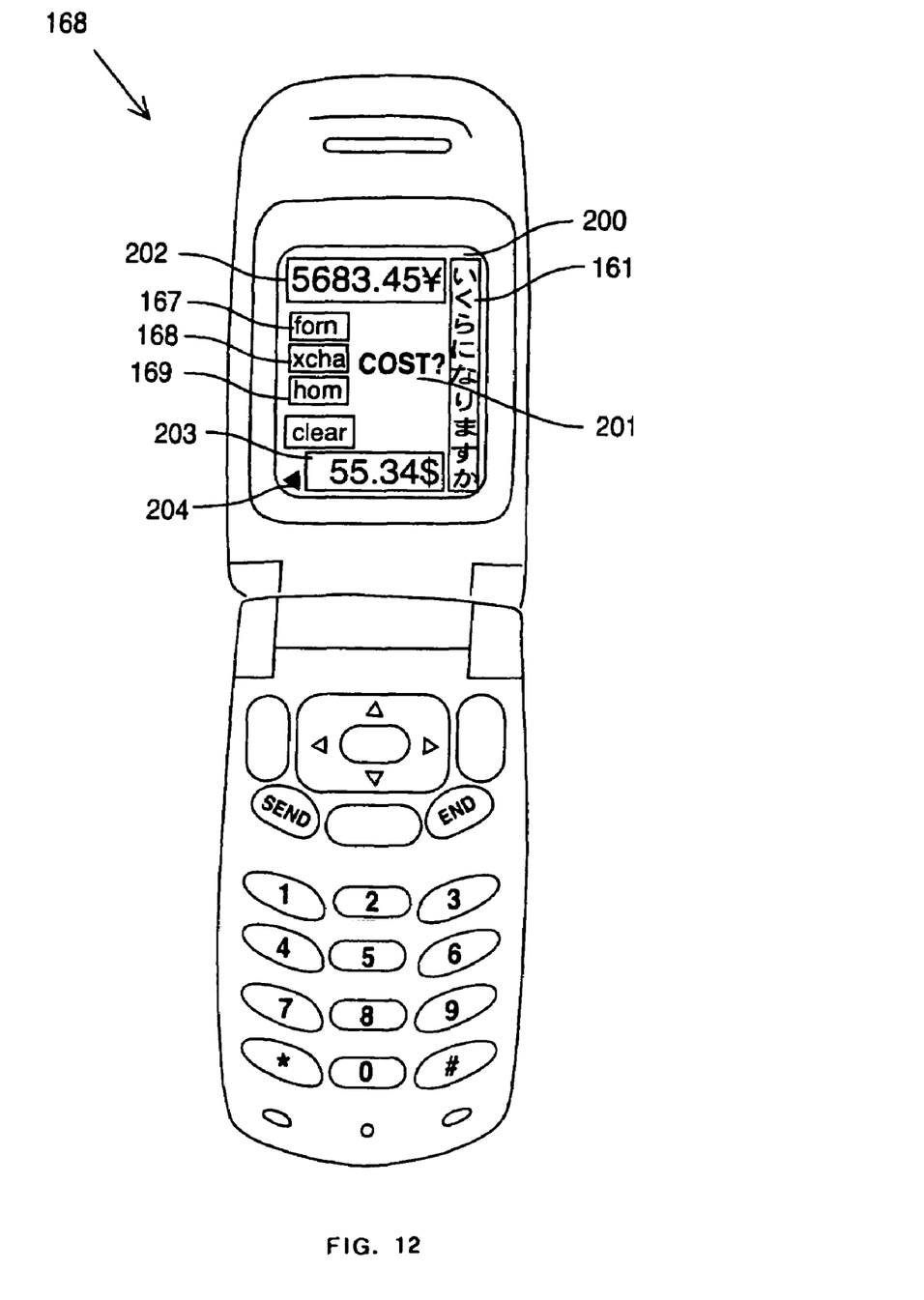
FIG. 12 shows a special, digitized, transactional flash card displayed on a cellular phone showing a currency converter.

FIGS. 10 through 12 show the digital, transactional flash card 1 displayed on a cellular phone 180. This is to illustrate the option of displaying the digital transactional flash cards also on electronic devices with small screens. To achieve this, the communication part of the digital, transactional flash card is displayed as "page one" 181 as shown in FIG. 10 and the information part as "page two" 182 as shown in FIG. 2. To move from page one to page two and reverse, two screen text boxes 183 or 184 can be tapped respectively. Or two buttons 185 and 186 on the phone can be programmed to perform the same task.

The communication part on page one 181 interacts for the traveler with the Japanese waiter displaying what is needed for that interaction which is essentially the name of the dish in Japanese 3 and smaller the name of the dish in English 187 so the traveler knows what is on this page. This page additionally displays an image of the dish 6 and four navigational icons 188–191. These are on this page because there is extra space but are not essential to the communication between the traveler and the waiter. The first navigational button "t" 188 gets the traveler out of the application onto the telephone function of this device. The "c" 189 button gets the traveler to the currency converter screen. The "f" button 190 adds the dish to the favorites list. The "p" 191 button adds the dish to the picks list. Also while in this mode the traveler can move from one dish to the next by pressing the left and right arrow on the navigational hardware button 192. He can also get to the next or previous navigational screen by tapping the up or down arrow on the same navigational button 192. To quit the application the traveler can tap the "end" button 193.

The information part on "page two" 182 contain in this embodiment essentially the description of the dish 5 of the digitized transactional flash card. Additionally in case the text is too big to display on page two scrolling buttons 194 allow for the text to be scrolled up and down.

Both screens also contain an arrow 195 pointing left that allows the first party user to get back to the beginning of the search in the navigational system.

All the functions assigned to different on-screen and hardware buttons can be distributed differently without changing the spirit of the invention. For example, "Page Two" could also be accessed by a navigational icon, with a "d" for description of the dish on it, without changing the invention. Also the dividing up of the digital, transactional flash card can be performed in many ways without changing the invention.

FIG. 12 shows a reduced version of the special, digital, transactional flash card 160 as displayed in FIG. 9 displaying a currency converter 200. The English translation of the question has been reduced to one word "cost?" 201. The converter also displays to separate numerical display boxes 202 and 203 to display the Yen and respective Dollar amount. And an arrow 204 pointing to the left will get the first party user back to the previous digital, transactional flash card. Again the smaller screen needs a different design with in this embodiment 200 is essentially only a currency converter with no additional questions about credit cards and traveler checks. Those questions could always be displayed as shown in FIGS. 10 and 11 on a page two of this special, digital, transactional flash card 200.

The programming for the application, which allows all the different functions, associated with digital, transactional flash cards to enter into the various computer memories of electronic devices and their executable programs can be done by anybody familiar with programming languages.

Accordingly, it should be understood that the embodiment herein is merely illustrative of the principles of the invention. Various other modifications may be made by those skilled in the art that will embody the principles of the invention and fall within the spirit and the scope thereof.

What is claimed is:

1. A method for enabling communication between first and second parties comprising the steps of:
   providing an electronic device adapted to display at least one digital transactional flash card from a plurality of transactional flash cards stored in a memory comprising a first text understandable to the first party and a second text understandable to the second party and an image, wherein both texts describe the image;
   selecting at least one digital transactional flash card from the memory;
   displaying the at least one digital transactional flash card; and
   communicating, by the first party, the at least one transactional flash card to the second party,
   wherein a user profile including digital transactional flash card data created by the first party is stored in the memory, and
   wherein the electronic device further comprises a navigational system comprising a plurality of cross-linked pages that allow the first party to select the stored flash cards from a plurality of cross-referenced groups.

2. A method according to claim 1 wherein the user profile comprises a list of the first party's favorite digital transactional flash cards.

3. A method according to claim 1 wherein the user profile comprises a list of the first party's picks of digital transactional flash cards.

4. A method according to claim 1 wherein the user profile contains comments entered by the first party.

5. A method according to claim 1 wherein the user profile comprises at least one note entered by the first party.

6. A method according to claim 1 wherein the electronic device is further adapted to send and retrieve other first party user profiles from the Internet.

7. A method according to claim 1 wherein the plurality of digital transactional flash cards may be sorted into groups.

8. A method according to claim 1, wherein the navigation system further has several programmed actions that assist the first party in moving through the selection process.

9. A method according to claim 1 further comprising the step of
   enabling the first party to communicate with another first party user of a second electronic device adapted to store a plurality of transactional flash cards in a memory by exchanging stored digital transactional flash cards between the first and second electronic devices.

10. A method according to claim 9, wherein at least two first parties have stored user profiles in the memories of the first and a second electronic devices, and the enabling step further comprising exchanging user profiles between the first and second electronic devices.

11. A method according to claim 10, wherein the user profiles of the at least two first parties are sent by the at least two electronic devices to an exchange facility on the internet from which they can be retrieved or viewed by other first parties.

12. A method according to claim 9, wherein at least one first party has stored user profiles of other first parties in the memory of at least one electronic device.

13. A method according to claim 9, wherein at least one electronic device comprises a camera.

14. A method according to claim 9, wherein first party users can exchange notes in form of images taken by the camera.

15. A method of enabling communication between first and second parties, comprising the steps of:
   providing a first electronic device having a display, the device adapted to store a plurality of digital transactional flash cards in a memory so that at least one flash card may be viewed on the display;
   selecting at least one digital transactional flash card from the memory;
   displaying the at least one digital transactional flash card comprising a first text understandable to the first party and a second text understandable to the second party and an image, wherein both texts describe the image; and
   providing the second party with a second electronic device having a display, the device adapted to receive through wireless or wired transmission from the first party a list comprising at least one digital transactional flash card that may be viewed on the display of the second electronic device,
   wherein at least one of the first and second electronic devices has a user profile which includes digital transactional flash card data stored in the memory, and
   wherein the electronic device further comprises a navigational system comprising a plurality of cross-linked pages that allow the first party to select the stored flash cards from a plurality of cross-referenced groups.

16. A method according to claim 15, wherein first party can transmit price inquiries to the second party.

17. A method according to claim 16, wherein the second party can beam to the first party an itemized bill with a total for the list of the items requested by at least one first party.

* * * * *